Patented Sept. 1, 1953

2,650,389

UNITED STATES PATENT OFFICE 2,650,389

PROCESS FOR MANUFACTURING SHAPED ARTICLES OF RUBBER HYDROCHLORIDE

Gerrit Schuur, The Hague, Netherlands, assignor to Rubber-Stichting, Delft, Netherlands No Drawing. Application October 30, 1950, Serial No. 193,038. In the Netherlands November 7, 1949

12 Claims. (Cl. 18—47.5)

1

This invention relates to process for manufacturing shaped articles of rubber hydrochloride and it comprises a method of making shaped articles, such as filaments, sheets, ribbons and molded products, wherein a finely-divided hydrocarbon-insoluble rubber hydrochloride powder, produced by the hydrochlorination of acid-stabilized rubber latex, is intimately dispersed in a liquid plasticizer in an amount which is in excess of that which is soluble in the rubber hydrochloride at ordinary temperatures and sufficient to produce a paste of sufficient plasticity to be formed into the desired shape, this molding paste usually containing a small amount of stabilizer for the rubber hydrochloride, the so-formed paste then being formed into the desired shape, the resulting shaped body being heated to temperatures about 110° C. but below decomposition temperatures in order to gelatinize the rubber hydrochloride, the excess plasticizer being then extracted with a solvent for the plasticizer in which the rubber hydrochloride is substantially insoluble in order to prevent bleeding of the plasticizer, the article finally being dried to remove the solvent. In the manufacture of filaments, ribbons and sheets by the new process, a stretching step is usually included after the gelatinization and before the extraction step, this stretching resulting in an increased tensile strength and a reduced diameter of the product; all as more fully hereinafter set forth and as claimed.

The principal object of the present invention is to provide a molding composition mainly consisting of a hydrocarbon-insoluble hydrochlorinated rubber, of the type produced by the hydrochlorination of acid-stabilized rubber latex, and an excess of plasticizer.

A further object of the invention is to manufacture shaped articles mainly consisting of hydrochlorinated rubber of said type by shaping them directly from a paste-like mixture of said hydrochlorinated rubber and an excess of plasticizer.

Another object of the invention is to manufacture articles from a hydrochlorinated rubber of the described type, which will not be attacked (or only slightly attacked) by organic solvents. Other objects of the invention consist in providing a process for manufacturing articles of hydrochlorinated rubber of the described type without first breaking down the hydrochlorinated rubber or breaking down the rubber from which the hydrochlorinated rubber is made, and for shaping articles at room temperature directly from a paste-like mixture of said hydrochlorinated rubber and plasticizer.

2

Still another object of this invention is to mold filaments, ribbons and sheets from the described molding composition in a continuous process.

The above and other objects of this invention are achieved by a novel process wherein a finely-divided hydrocarbon-insoluble rubber hydrochloride, produced by the hydrochlorination of acid-stabilized rubber latex, is finely dispersed in an excess of a liquid plasticizer for the rubber hydrochloride to make a plastic paste, a stabilizer for the rubber hydrochloride being included in the paste if desired. This paste is then ready for the shaping step which can be accomplished by extrusion through an orifice or spinneret or by any of the conventional molding and forming procedures used in the plastic and ceramic arts. The paste may be sufficiently stiff to produce shaped articles which will hold their shape during the following heating step which is conducted at temperatures ranging from about 110° C. up to temperatures producing decomposition of the rubber hydrochloride. The heating step can be conducted in the air or a bath of non-solvent can be employed. This heating causes the mixture of rubber hydrochloride and plasticizer to gelatinize, that is, to unite or agglomerate into a homogeneous body. If the shaped product is a filament, ribbon or sheet, or if for any reason it is desired to increase its tensile strength and/or decrease its diameter, the product is stretched at this point. Stretching may range from about 200 up to 800 per cent based on the length of the product. The excess plasticizer in the mass can be removed readily in an extraction step wherein the body is treated with a volatile organic solvent which will dissolve the plasticizer without dissolving the rubber hydrochloride. The product is then dried to remove the solvent used in the extraction step.

The new process is particularly applicable to the formation of filaments or threads of rubber hydrochloride of the described type and appears to be the first commercially practical method which has been suggested for this purpose. In the prior art it has been proposed to make filaments from cast sheets of rubber hydrochloride by cutting the sheets into strips and then twisting or rolling and stretching—a process which is obviously not subject to commercial exploitation.

The particular rubber hydrochloride which is used in the present invention is one that is substantially insoluble in hydrocarbons such as benzene, toluene, xylene and aliphatic hydrocarbon liquids. It is also insoluble in dioxane, chlorobenzene, chloroform etc. In some of these solvents, such as chloroform, the rubber hydrochloride swells to some extent even at room temperatures while at elevated temperatures it swells also in benzene, toluene etc. without dissolving. The requirement that the rubber hydrochloride be hydrocarbon—insoluble is due to the fact that in the step wherein the excess plasticizer is removed the rubber hydrochloride should remain substantially undissolved. The insolubility requirement therefore depends upon the solvent used in the extraction step as well as upon the plasticizer which is used in the process. This rubber hydrochloride is produced by hydrochlorinating an acid-stabilized rubber latex, as described in the copending application of G. J. van Veersen, Serial Number 784,299, filed April 10, 1948, now abandoned. This process produces a finely-divided rubber hydrochloride which has the special solubility and other characteristics required in the present process.

The plasticizer used can be any of the conventional plasticizers which have been used for plasticizing rubber hydrochloride. It is important, however, to choose a solvent-soluble plasticizer which can be dissolved without dissolving the rubber hydrochloride which means that the plasticizer and solvent used in the extraction step must be correlated. Examples of suitable plasticizers are chlorinated diphenyl, tricresyl-phosphate, butyl stearate, dioctyl phthalate, di-butyl phthalate, chlorinated paraffin, alkoxy esters, phthalic acid and sebacic acid esters, esters of salicyclic acid, esters of benzoylbenzoic acid, chlorinated naphthalene etc.

These plasticizers should be substantially non-volatile and should have melting points below about 50° C. so that the rubber hydrochloride can be dispersed in the plasticizer while the latter is liquid in order to make a dough-like plastic mixture. And, of course, the plasticizer must be compatible with the rubber hydrochloride.

The quantity of plasticizer required to make the dough-like plastic mass or paste, which is used in the forming step of the new process, depends upon the fineness of the rubber hydrochloride, upon what plasticizer used, its viscosity, melting point etc. and also upon the type of forming step which is to be employed. When the paste is to be extruded through a fine orifice, a paste of greater fluidity is required than when the forming step is to be done with a trowel or spatula or by molding or modeling, for example. In modeling the consistency required in the paste is much like that required of clay slips used in the ceramic industry. A few experimental tests are sufficient to determine the optimum quantity of plasticizer to be employed. To produce a dough-like plastic mass such an amount of plasticizer is required, that the articles would contain an excess of plasticizer, i. e. an amount that would bleed to the surface at ordinary temperatures if it were not removed by the extraction step in the process. Most of the common plasticizers produce pastes of suitable characteristics when mixed with the rubber hydrochloride in proportions greater than 35 per cent based on the weight of the rubber hydrochloride. Optimum proportions usually range from about 70 to 110 per cent based on the weight of the rubber hydrochloride while a plasticizer content of more than 150 parts to 100 parts of rubber hydrochloride is usually disadvantageous owing to the large amount of plasticizer which must be extracted during the extraction step of the process. A large excess of plasticizer does no harm provided that such excess is necessary to produce a paste of the desired consistency. Workability of the mix usually increases with increase of the proportion of plasticizer.

Mixing of the rubber hydrochloride with the plasticizer can be accomplished in any suitable way. A simple stirring operation can be used or a paint grinder can be employed, if desired, provided that care be taken not to raise the temperature of the paste to the point at which any substantial gelatinization occurs. It is also usually possible to mix in the plasticizer during the manufacture of the rubber hydrochloride, for example during or prior to the hydrochlorinating step.

The forming paste usually loses some of its plasticity if permitted to stand too long, that is, a week or longer, even at room temperatures. It is therefore desirable to conduct the forming step of the new process rather promptly after the paste is prepared.

It is usually advantageous to incorporate a stabilizer for the rubber hydrochloride in the paste. These stabilizers are usually alkaline reacting solids or liquids which are capable of reacting with or absorbing and HCl evolved by the rubber hydrochloride. They stabilize against heat and/or light. They can be used in small proportions, such as from about 1 to 5 per cent by weight, based on the weight of the paste. Any of the conventional stabilizers which have been used for stabilizing rubber hydrochloride can be used. Triethanolamine and MgO are examples of suitable stabilizers. Of course various fillers and dyes can also be incorporated in the plastic mix.

The shaping step of the new process can be conducted at room temperature if desired or at slightly elevated temperatures below gelatinization temperature of the plastic mix. In the case of filaments, ribbons etc. the dies through which these articles are extruded can be cooled if necessary to prevent premature gelatinization.

The gelatinizing step of the new process is conducted by heating the shaped article to temperatures above 110° C. but below temperatures causing decomposition of the rubber hydrochloride. The most advantageous temperatures are those within the range of from about 110° to 180° C. Heating at temperatures below 110° C. is not usually practical owing to the long time required. The higher the temperature employed the shorter the time required to produce gelatinization. At a temperature of 180° C. for example gelatinization takes place within a matter of seconds in the case of thin objects and a longer exposure to such temperatures should not be employed owing to the fact that this would cause decomposition of the rubber hydrochloride. The time required for gelatinization depends, of course, upon the thickness of the shaped article. Except for articles of substantial thickness a gelatinization time of about 20 minutes is ample and should not be exceeded.

Since the forming paste contains a quantity of plasticizer which is greater than that which is soluble in the rubber hydrochloride at ordinary temperatures, this excess plasticizer would bleed or sweat out of the finished object. The purpose of the extraction step is to remove this excess, that is, any plasticizer which is above the solubility limit.

The stretching step which usually follows the gelatinizing step in the case of filaments, sheets etc. enables the production of finer filaments and thinner sheets than is practically possible by extrusion only. Best results are obtained when the stretching amounts to from about 400 to 800 per cent. If desired the stretching step can be conducted after the extraction step. It must, of course, precede the drying step.

The extraction can be accomplished with any inert volatile solvent for the plasticizer which is a non-solvent for the rubber hydrochloride. It is not necessary that the solvent be one which does not cause the rubber hydrocloride to swell since a slight swelling appears to do no harm. Any swelling is eliminated during the subsequent drying step. A large number of solvents are available among which there may be mentioned petroleum ether, acetone, ethyl ether, ethyl acetate, methanol, benzene etc. Low boiling solvents are advantageous since it is then possible to recover the excess plasticizer from the spent solvent in a simple manner.

It is usually not necessary to support the shaped object during the gelatinizing and extracting steps. Of course if exact dimensions are required in the finished article a mandril or supporting form can be used during the gelatinizing and extracting steps.

The drying step of the process is to eliminate the solvent from the extraction step. If the solvent is sufficiently volatile drying can be conducted at room temperatures. To speed up the drying process elevated temperatures can be employed below those causing decomposition of the hydrochloride. Radiant heating is advantageous in the drying step.

In the continuous manufacture of threads, ribbons or thin sheets it is possible to extrude the rubber hydrochloride-plasticizer mixture through an orifice directly into a gelatinizing bath operated at such a temperature that gelatinization requires but a fraction of a second, the gelatinized article can then be drawn over rolls operated at a differential speed to stretch the article then through a heated solvent bath to extract the excess plasticizer and finally through a drying oven to eliminate the solvent. All operations can readily be synchronized by suitable choice of temperatures, solvent, plasticizer etc. The temperature of the plastic as it passes through the die should not rise appreciably above about 60° C. since at higher temperatures gelatinization proceeds to such an extent that it interferes with the extrusion.

My invention can be described in greater detail by reference to the following specific examples which represent practical operating embodiments of my process. The parts in the examples are parts by weight. The drying of the article after the extraction in the examples is done by allowing the solvent to evaporate from the articles at room temperature except in Example 9. The first example exemplifies the process as applied to the production of articles shaped by hand.

EXAMPLE 1

100 parts of hydrochlorinated rubber, 90 parts of tricresylphosphate and 5 parts of triethanolamine are intimately mixed. Around a supporting form a jar is modeled with a wall thickness of 3 mm. Thereupon the form with the jar is immersed in a bath of glycerin at 130° C. for 20 minutes whereby gelatinizing takes place. Afterwards the object is removed from the form and extracted with gasoline for 48 hours. Air drying completes the process.

EXAMPLE 2

100 parts of hydrochlorinated rubber are mixed with 80 parts of dibutylphthalate and 5 parts of MgO. This pastelike mixture is shaped on an iron tube in a thickness of approximately 1 mm. Thereupon the object is heated at 130° C. for 15 minutes whereby gelatinizing occurs. Thereupon the excess of plasticizer is extracted with gasoline for 24 hours at room temperature. A non-porous layer is thus formed on the iron tube, by which layer it is made resistant to chemical attack and corrosion.

EXAMPLE 3

100 parts by weight (83.5 parts by volume) of hydrochlorinated rubber, 100 parts by weight (67 parts by volume) of tricresylphosphate, 5 parts of triethanolamine and 10 parts of titanium dioxide are intimately mixed. At room temperature the mixture is extruded through a round orifice of 2 mm. diameter, so that a thread is obtained. This thread is gelatinized by heating for 10 minutes at 130° C., thereupon the thread is stretched 600%. After extracting the excess of plasticizer for 24 hours with acetone at 20° C. a thread is obtained containing 9.2% of plasticizer, having a tensile strength of 1500 kg./cm.$^2$ and a stretch at rupture of approximately 40%.

The following three examples illustrate the manufacture of threads starting from a mixture containing different quantities of plasticizer.

EXAMPLE 4

100 parts by weight of hydrochlorinated rubber, 50 parts of tricresylphosphate and 5 parts of triethanolamine are intimately mixed. At room temperature the mixture is extruded through a round orifice of 2 mm. diameter, so that a thread is obtained. This thread is gelatinized for 16 seconds in a bath of glycerol at 110° C. Thereupon the thread is stretched 600%. After extracting the excess of plasticizer for 36 hours with gasoline at 20° C., a thread is obtained having a tensile strength of 1920 kg./cm.$^2$ and a stretch at rupture of approximately 40%.

EXAMPLE 5

100 parts by weight of hydrochlorinated rubber, 120 parts by weight of tricresylphosphate and 5 parts by weight of triethanolamine are intimately mixed. At room temperature the mixture is extruded through a round orifice of 2 mm. diameter, so that a thread is obtained. This thread is gelatinized for 16 seconds in a bath of glycerol at 110° C. Thereupon the thread is stretched 600%. After extracting the excess of plasticizer for 36 hours with gasoline at 20° C., a thread is obtained having a tensile strength of 1860 kg./cm.$^2$ and a stretch at rupture of approximately 50%.

EXAMPLE 6

100 parts by weight of hydrochlorinated rubber, 150 parts by weight of tricresylphosphate and 5 parts by weight of triethanolamine are intimately mixed. At room temperature the mixture is extruded through a round orifice of 2 mm. diameter, so that a thread is obtained. This thread is gelatinized for 16 seconds, in a bath of glycerol at 110° C. Thereupon the thread is stretched 600%. After extracting the excess of plasticizer for 36 hours with gasoline at 20° C. a thread is obtained having a tensile strength of 1840 kg./cm.$^2$ and a stretch at rupture of approximately 50%.

The following four examples illustrate the manufacture of threads starting from a mixture containing different kinds of plasticizer.

EXAMPLE 7

100 parts of hydrochlorinated rubber are mixed with 40 parts of butylstearate. At room temperature the mixture is extruded through a round orifice with a diameter of 2 mm. The resulting thread is gelatinized 5 minutes in air at 130° C.; thereupon the thread is stretched 500%. After extracting the excess of plasticizer with acetone for 2 hours, a thread is obtained with a good tensile strength.

EXAMPLE 8

100 parts of hydrochlorinated rubber are intimately mixed with 90 parts of tricresylphosphate, 5 parts aluminum powder and 5 parts of triethanolamine. At room temperature the mixture is extruded through a round orifice with a diameter of 1.2 mm. This thread is gelatinized in 4 seconds in a bath of glycerol at 150° C.; thereupon the thread is stretched 600%. After extracting the excess of plasticizer with gasoline at room temperature for 24 hours, a thread of 0.34 mm. diameter is obtained with a tensile strength of 1200 kg./cm.$^2$ and a stretch at rupture of 40%.

EXAMPLE 9

100 parts of hydrochlorinated rubber are intimately mixed with 70 parts of dibutylphthalate and 5 parts of triethanolamine. At room temperature the mixture is extruded through a round orifice having a diameter of 0.2 mm. This thread is gelatinized in 0.2 second in a bath of glycerol at 130° C.; thereupon the thread is stretched 650%. After extracting the excess plasticizer for 2 minutes with acetone at 50° C. and allowing the acetone to evaporate at 60° C. a thread is obtained with a diameter of 0.06 mm., a tensile strength of 5000 kg./cm.$^2$ and a stretch at rupture of approximately 35%.

EXAMPLE 10

100 parts of hydrochlorinated rubber are intimately mixed with 100 parts of chlorinated diphenyl and 5 parts of chromate green. At room temperature the mixture is extruded through a round orifice having a diameter of 2 mm. This thread is gelatinized for 30 minutes in the air at 130° C.; thereupon the thread is stretched 600%. After extracting the excess plasticizers with ethyl ether at room temperature for 24 hours, a thread of 0.75 mm. diameter is obtained with a tensile strength of 1800 kg./cm.$^2$ and a stretch at rupture of 40%.

The next example illustrates the manufacture of a strip.

EXAMPLE 11

100 parts by weight of hydrochlorinated rubber is mixed with 90 parts by weight of tricresylphosphate and 5 parts by weight of triethanolamine, 5 parts of lead titanate and 1 part of a copper complex of phtalocyanine, a blue dyestuff. At room temperature the mixture is extruded through an orifice with dimensions of 5 mm. x 1 mm. The so shaped strip is gelatinized for 5 seconds at 130° C. in a bath of glycerol whereupon the strip is stretched 600%. After extracting the excess plasticizer with ethyl acetate at room temperature, a strip was obtained 2.6 mm. in width and 0.4 mm. thick.

The heat transmission in glycerol is much faster than in air. The gelation time increases with the thickness of the article. The gelation time decreases as the temperature is increased. The next example demonstrates the effect of these variables.

EXAMPLE 12

The past-like mixture employed contains 100 parts of hydrochlorinated rubber, 80 parts of tricresylphosphate and 5 parts of triethanolamine. From this mixture threads of various diameter are formed and gelatinized in various ways.

*Gelatinizing in a bath of glycerol*

| Thread diameter, mm. | Temp. glycerol, degrees | Gelatinizing time, sec. |
|---|---|---|
| 0.8 | 130 | 2-4 |
| 0.8 | 150 | 1 |
| 0.8 | 170 | 1 |
| 2 | 130 | 10-15 |
| 2 | 150 | 5-10 |

*Gelatinizing in air.*

| Thread diameter, mm. | Temperature, degrees | Gelatinizing time, min. |
|---|---|---|
| 2 | 130 | 5 |
| 5 | 130 | 10 |

The next examples illustrate the influence of different solvents for the extraction of the excess of plasticizer. The effectiveness of a certain solvent depends upon the plasticizer used. The extraction is more rapid as the temperature is increased.

EXAMPLE 13

100 parts of hydrochlorinated rubber, 80 parts of dibutylphthalate and 5 parts of triethanolamine are intimately mixed. The mixture is extruded through an orifice of 0.8 mm. diameter, whereupon the thread is gelatinized in 30 seconds in a bath of glycerol at 140° C. After stretching 600% samples of the thread are extracted with different solvents as shown in the table.

| Solvent | Time (min.) | Temp., ° C. | Percent Plasticizer remaining |
|---|---|---|---|
| Gasoline | 1 | 50 | 20 |
| Ethanol | 1 | 50 | 25 |
| Acetone | 1 | 50 | 8 |
| Ethyl Acetate | 1 | 50 | 10 |
| Butanone | 1 | 50 | 5 |

When the above mixture contains various plasticizers the table below shows the amount of plasticizer remaining after extraction with acetone at 20° C. for 1 minute.

Percent
Dibutylphthalate _____ 10
Tricresylphosphate _____ 25
Chlorinated diphenyl _____ 18

EXAMPLE 14

100 parts of hydrochlorinated rubber, 80 parts of tricresylphosphate and 5 parts of triethanolamine are intimately mixed. The mixture is extruded through an orifice of 0.8 mm. diameter, whereupon the thread is gelatinized in 30 seconds in a bath of glycerol at 140° C.

After stretching 600% and extracting the excess of plasticizer the thread has a diameter of 0.3 mm.

Samples of the thread are extracted with different organic solvents as shown in the table:

| Solvent | Time (min.) | Temp., °C. | Percent Plasticizer remaining |
|---|---|---|---|
| Acetone | 1 | 50 | 15. |
| Ethyl Acetate | 1 | 50 | 10. |
| Butanone | 1 | 50 | 5. |
| Gasoline | 1 | 50 | Very high. |

The next table illustrates how much plasticizer remains after extraction with acetone at various temperatures and for varying times.

| Time, minutes | Temperature, °C. | Percent plasticizer remaining |
|---|---|---|
| 1 | 20 | 25 |
| 5 | 20 | 10 |
| 10 | 20 | 5 |
| 1 | 50 | 15 |
| 5 | 50 | 5 |
| 10 | 50 | 3 |

The amount of plasticizer extracted depends upon the diameter of the thread. Thin threads can be extracted to a predetermined amount of residual plasticizer in less time than a thicker thread.

The next example illustrates the influence of the amount of stretching.

EXAMPLE 15

100 parts by weight of hydrochlorinated rubber, 90 parts by weight of tricresylphosphate and 5 parts by weight of triethanolamine are intimately mixed. At room temperature the mixture is extruded through an orifice. The so shaped thread is gelatinized in 30 seconds in a bath of glycerol at 150° C. Samples of the gelatinized thread are stretched to different extents and thereafter at room temperature extracted with gasoline for 36 hours.

The influence of the amount of stretching on the tensile strength and the stretch at rupture is shown in the following table:

| Stretch percent | 500 | 550 | 600 | 800 |
|---|---|---|---|---|
| Tensile strength kg./cm.² | 1,420 | 1,640 | 1,750 | 2,425 |
| Stretch at rupture percent | 60 | 50 | 40 | 30 |

While the foregoing description covers the most advantageous methods of practicing the present process it is obvious, of course, that various modifications can be made in the specific procedures which have been described without departing from the purview of this invention. In order to produce the forming paste of rubber hydrochloride and plasticizer it is necessary that the plasticizer have a melting point below the decomposition point of the rubber hydrochloride since during the shaping or forming step the paste should constitute finely-divided rubber hydrochloride uniformly dispersed in a liquid plasticizer.

What is claimed is:

1. In the production of shaped articles of rubber hydrochloride, the process which comprises dispersing a finely-divided hydrocarbon-insoluble rubber hydrochloride, produced by the hydrochlorination of acid-stabilized rubber latex, in an amount of solvent-soluble plasticizer which is in excess of that which is soluble in the hydrochloride at ordinary temperatures and sufficient to make a plastic paste at the temperature of the forming step, forming the paste into the desired shape at a temperature below the gelatinizing temperature, heating the formed article to gelatinizing temperatures below the decomposition point of the hydrochloride, treating the article with a volatile solvent for the plasticizer which is a non-solvent for the rubber hydrochloride to remove sufficient plasticizer to prevent bleeding thereof, and drying to remove the solvent.

2. The process of claim 1 wherein the rubber hydrochloride and plasticizer are mixed in the proportions of from about 35 to 150 per cent of the plasticizer based on the weight of the hydrochloride.

3. The process of claim 1 wherein the plastic mass is extruded through an orifice to form an article having at least one small dimension, the shaped article is passed through a gelatinizing bath holding an inert liquid heated to temperatures within said temperature range, the gelatinized thread is then stretched, and thereafter passed through a volatile solvent for the plasticizer which is a non-solvent for the rubber hydrochloride to remove excess plasticizer and then dried.

4. The process of claim 1 wherein the shaped article is a filament.

5. The process of claim 1 wherein the plastic mass is shaped at substantially room temperatures and then heated within the temperature range of from about 110° to 180° C. to produce gelatinization.

6. The process of claim 1 wherein the plastic mass is formed by extrusion through an orifice.

7. The process of claim 1 wherein the plastic mass is shaped by modeling.

8. The process of claim 1 wherein a stabilizing agent for the rubber hydrochloride is mixed with the hydrochloride and plasticizer.

9. The process of claim 1 wherein the plasticizer and rubber hydrochloride are mixed in the proportions of from about 70 to 110 per cent plasticizer based on the weight of the hydrochloride.

10. In the production of shaped articles of rubber hydrochloride, the process which comprises dispersing a finely-divided hydrocarbon-insoluble rubber hydrochloride, produced by the hydrochlorination of acid-stabilized rubber latex, in a solvent-soluble liquid plasticizer which is substantially non-volatile but which has a melting point below about 60° C. to produce an extrudable paste, the quantity of plasticizer used being in excess of that which is soluble in the rubber hydrochloride at ordinary temperatures and within the limits of about 35 to 150 per cent by weight based on the weight of the rubber hydrochloride, extruding the resulting dispersion at a temperature below the gelatinizing temperature through an orifice, heating the so-formed article to gelatinizing temperatures within the range of from about 110° to 180° C. for a time sufficient to produce gelatinization without decomposing the rubber hydrochloride, stretching the gelatinized article to increase its tensile strength, thereafter dissolving out part of the plasticizer with a solvent for the plasticizer which is a non-solvent for the rubber hydrochloride to prevent bleeding of the plasticizer and then drying to remove the solvent.

11. In the manufacture of shaped articles, the process which comprises dispersing a finely-divided hydrocarbon-insoluble rubber hydrochloride, produced by the hydrochlorination of acid-stabilized rubber latex, in from about 35 to 110 per cent, based on the weight of the rubber hydrochloride, of a liquid substantially non-volatile plasticizer in amount in excess of that which is soluble in the hydrochloride at ordinary temperatures and sufficient to make an extrudable plastic dispersion, extruding this dispersion through an orifice having a small dimension in at least one direction at a temperature below the gelatinizing temperature, heating the so-shaped article to temperatures within the range of from about 110° to 180° C. to gelatinize the shaped mass, stretching the shape mass to the extent of from about 400 to 800 per cent of its length, and thereafter dissolving out part of the plasticizer sufficient to prevent bleeding thereof from the shaped article by contacting the article with a volatile solvent for the plasticizer which is a non-solvent for the rubber hydrochloride, and then removing the solvent.

12. In the manufacture of shaped articles, the process which comprises dispersing a finely-divided hydrocarbon-insoluble rubber hydrochloride produced by the hydrochlorination of acid-stabilized rubber latex, in an amount of liquid substantially non-volatile plasticizer, having a melting point below about 50° C., which is in excess of that which is soluble in the hydrochloride at ordinary temperatures and sufficient to make an extrudable plastic dispersion, continuously extruding the plastic dispersion through an orifice having a small dimension in at least one direction at a temperature below the gelatinizing temperature, continuously passing the extruded mass through a bath containing an inert liquid heated to a temperature within the range of from about 110° to 180° C. sufficient to gelatinize the shaped mass, continuously stretching the shaped mass within the range of from about 400 to 800 per cent of its length, thereafter continuously passing the stretched article through a bath of a volatile solvent for the plasticizer but a non-solvent for the rubber hydrochloride to extract sufficient of the plasticizer to prevent bleeding thereof from the article, and then removing the solvent.

GERRIT SCHUUR.

References Cited in the file of this patent

UNITED STATES PATENTS

| Number | Name | Date |
|---|---|---|
| 2,164,367 | Winkelmann et al. | July 4, 1939 |
| 2,174,674 | Winkelmann | Oct. 3, 1939 |
| 2,201,034 | Gebauer et al. | May 14, 1940 |
| 2,214,442 | Spanagel | Sept. 10, 1940 |
| 2,238,730 | Hauffe | Apr. 15, 1941 |
| 2,536,789 | Van Amerongen | Jan. 2, 1951 |

FOREIGN PATENTS

| Number | Country | Date |
|---|---|---|
| 500,298 | Great Britain | Feb. 7, 1939 |
| 519,788 | Great Britain | Apr. 5, 1940 |